(12) United States Patent
Li et al.

(10) Patent No.: US 11,655,192 B2
(45) Date of Patent: May 23, 2023

(54) BARRIER COATINGS

(71) Applicant: Rolls-Royce Corporation, Indianapolis, IN (US)

(72) Inventors: Li Li, Carmel, IN (US); Jun Shi, Carmel, IN (US); Scott Nelson, Carmel, IN (US); Taylor K. Blair, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/522,524

(22) Filed: Jul. 25, 2019

(65) Prior Publication Data
US 2021/0024424 A1    Jan. 28, 2021

(51) Int. Cl.
*C04B 35/622* (2006.01)
*B05D 1/38* (2006.01)
*B05D 3/12* (2006.01)
*C04B 35/16* (2006.01)

(52) U.S. Cl.
CPC .......... *C04B 35/62222* (2013.01); *B05D 1/38* (2013.01); *B05D 3/12* (2013.01); *C04B 35/16* (2013.01); *C04B 2235/3427* (2013.01); *C04B 2235/5276* (2013.01); *C04B 2235/5296* (2013.01)

(58) Field of Classification Search
CPC ...... B05D 1/38; B05D 3/12; C04B 35/62222; C04B 35/16; C04B 2235/3427; C04B 2235/5276; C04B 2235/5296
See application file for complete search history.

(56) References Cited

U.S. PATENT DOCUMENTS

| | | | |
|---|---|---|---|
| 6,670,046 B1* | 12/2003 | Xia .................. | C23C 28/044 428/116 |
| 2007/0134408 A1* | 6/2007 | Skoog ................ | F01D 5/288 427/142 |
| 2018/0105471 A1* | 4/2018 | Shi .................... | C23C 16/045 |
| 2018/0135458 A1* | 5/2018 | Hudson ............... | F02C 3/04 |

OTHER PUBLICATIONS

Hayashi et al., "Thermal expansion coefficient of yttria stabilized zirconia for various yttria contents," 2005, Elsevier, Solid State Ionics, Issue 176, pp. 613-619 (Year: 2005).*
Walter, Pilkey, "Formulas for Stress, Strain, and Structural Matrices—Chapter 4," May 5, 2017, John Wiley and Sons, Second Edition, pp. 149-223 (Year: 2017).*

* cited by examiner

*Primary Examiner* — Maria V Ewald
*Assistant Examiner* — Ethan Weydemeyer
(74) *Attorney, Agent, or Firm* — Shumaker & Sieffert, P.A.

(57) ABSTRACT

An example article includes a substrate and a barrier coating on the substrate extending from an inner interface facing the substrate to an outer surface opposite the inner interface. The barrier coating includes a bulk matrix and a plurality of discrete plugs inset within the bulk matrix and dispersed across the outer surface of the barrier coating. An example technique includes forming the barrier coating on the substrate of a component.

20 Claims, 3 Drawing Sheets

BARRIER COATINGS

TECHNICAL FIELD

The disclosure relates to barrier coatings for high temperature components.

BACKGROUND

High temperature components such as engines face increasing performance demands at higher temperatures. Under certain operating conditions, siliceous materials such as airborne dust, sand, fly ash, volcanic dust, concrete dust, and fuel residue ingested into a high temperature component may accumulate on certain hot surfaces, for example, on blade, vanes, combustion tiles and turbine segments. These materials may fuse and melt when exposed to high temperatures, for example, temperatures above 1240° C., depending on the composition of the deposited materials. Calcium-Magnesium-Aluminosilicate (CMAS) is the general name given to these molten deposits, as the predominant oxides are Calcia (CaO), Magnesia (MgO), Alumina ($Al_2O_3$) and Silica ($SiO_2$). Engine components may be coated with one or more barrier layers to provide protection against thermal flux, erosion, and/or environmental contamination, for example, by reducing or preventing CMAS formation, migration, or infiltration.

SUMMARY

The disclosure describes example barrier coatings, for example, environmental barrier coatings (EBCs), thermal barrier coatings (TBCs), or abradable coatings, and techniques and systems for manufacturing barrier coatings.

In some examples, the disclosure describes an example article including a substrate and a barrier coating on the substrate extending from an inner interface facing the substrate to an outer surface opposite the inner interface. The barrier coating includes a bulk matrix and a plurality of discrete plugs inset within the bulk matrix. Each of the plurality of discrete plugs includes an outer surface located at the outer surface of the barrier coating.

In some examples, the disclosure describes an example technique including forming a barrier coating on a substrate of a component. The barrier coating extends from an inner interface facing the substrate to an outer surface opposite the inner interface. The barrier coating includes a bulk matrix and a plurality of discrete plugs inset within the bulk matrix. Each of the plurality of discrete plugs includes an outer surface located at the outer surface of the barrier coating.

The details of one or more examples are set forth in the accompanying drawings and the description below. Other features, objects, and advantages will be apparent from the description and drawings, and from the claims.

DETAILED DESCRIPTION

Figure 1:
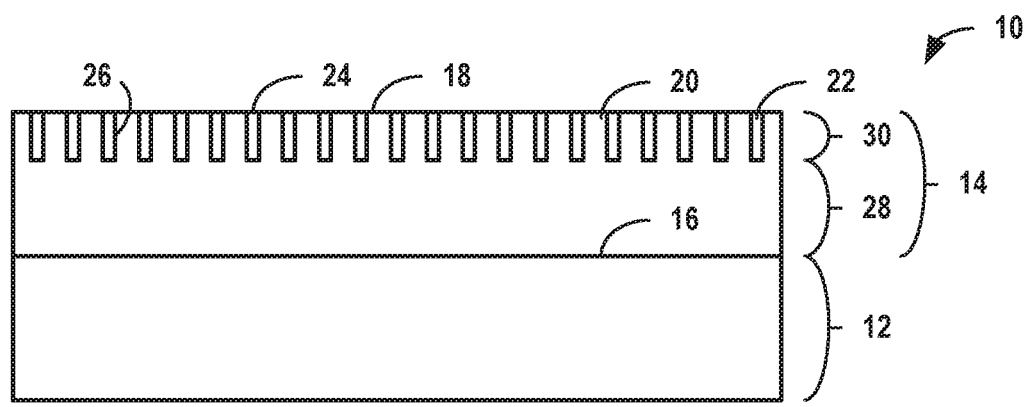
FIG. 1 is a conceptual cross-sectional view of an example article including an example barrier coating that includes a plurality of discrete plugs in a bulk matrix.

The disclosure generally describes example barrier coatings, such as environmental barrier coatings (EBCs), thermal barrier coatings (TBCs), abradable coatings, wear resistant coatings, or the like, and techniques for manufacturing barrier coatings. The example barrier coatings include a bulk matrix and a plurality of discrete plugs inset within the bulk matrix and dispersed across an outer surface of the barrier coating. Each of the plurality of discrete plugs includes an outer surface located at the outer surface of the barrier coating. The plurality of discrete plugs introduces structural and/or compositional variations, such as discontinuities and phases, near the outer surface of the barrier coating. The structural and/or compositional variations may improve desired properties, such as abradability, crack resistance, CMAS resistance, or the like, of the outer surface of the barrier coating and reduce undesired properties, such as CTE mismatch, that may occur from the structural and/or compositional variations.

In some examples, the plurality of discrete plugs may limit propagation of cracks through the barrier coating by providing a regular distribution of discontinuities to intersect the cracks. For example, a crack propagating through the bulk matrix may encounter a plug of the plurality of discrete plugs. The interface formed between the plug and the bulk matrix may dislocate the crack and limit a leading end of the crack to the interface. In this way, the barrier coating may have increased crack resistance compared to barrier coatings that do not incorporate a plurality of discrete plugs near an outer surface of a bulk matrix.

In some examples, the plurality of discrete plugs may increase resistance of the barrier coating to active agents, such as CMAS, water vapor, or the like. For example, the plurality of discrete plugs may have increased resistance to CMAS compared to the bulk matrix, reduced porosity compared to the bulk matrix, or both. While such a composition may have a different CTE than the composition of the bulk matrix, the properties of the plurality of discrete plugs may be selected such that stresses created by the CTE mismatch may be distributed over a surface of the barrier coating, rather than between horizontal layers as in a bilayer configuration. In this way, the barrier coating may incorporate materials having increased environmental resistance with reduced mechanical stresses caused by CTE mismatch as compared to barrier coatings that incorporate such materials in continuous configurations, such as layers.

In some examples, the plurality of discrete plugs may increase abradability of the barrier coating. For example, a composition of the plurality of discrete plugs may have an enhanced or reduced abradability or porosity compared to the composition of the bulk matrix, such that a size, shape, and/or concentration of the plurality of discrete plugs may be selected to provide the barrier coating with a customized abradability. In this way, the barrier coating may incorporate materials with enhanced or reduced abradability while maintaining desired properties of the bulk matrix as compared to barrier coatings that do not incorporate such materials.

The plurality of discrete plugs may permit a high degree of configurability of the barrier coatings. For example, the plurality of discrete plugs may have shapes, patterns, sizes, and compositions that may be selected throughout the outer surface of the barrier coating. Such variations may be difficult or impossible to provide when incorporating multiple phases into a barrier coating in situ, e.g., from a slurry, thermal spraying, or a vapor deposition technique. In this way, the barrier coating may be tailored with specific properties across the outer surface of the barrier coating.

FIG. 1 is a conceptual cross-sectional view of an example article 10 that includes an example barrier coating 14 that includes a plurality of discrete plugs in a bulk matrix. Barrier coating 14 is on a substrate 12 of a component. The component may be a high-temperature component, such as an industrial, automotive, or aeronautical component. In some examples, the component includes a gas turbine engine component. Substrate 12 may include at least one of a metal, alloy, or a ceramic, such as a ceramic matrix composite (CMC). Barrier coating 14 may be directly on substrate 12 or may be separated from substrate 12 by one or more intermediate layers, such as a bond layer.

Barrier coating 14 extends from an inner interface 16 facing substrate 12 to an outer surface 18 opposite inner interface 16. Barrier coating 14 may protect substrate 12 from an operating environment of the component. For example, barrier coating 14 may be a thermal barrier coating (TBC) configured to protect substrate 12 from thermal incursions, an environmental barrier coating (EBC) configured to protect substrate 12 from external contaminants or species, an abradable coating, a wear resistant coating, or the like, or may exhibit combinations of functions corresponding to one or more of a TBC, an EBC, an abradable coating, or a wear resistant coating.

In some examples, article 10 further includes a bond coat applied to at least a portion of substrate 12, and barrier coating 14 is on the bond coat (not shown). Thus, the bond coat may promote adherence or retention of barrier coating 14 on substrate 12. The bond coat may include at least one metal, metalloid, alloy, ceramics, and mixtures or combinations thereof. In some examples, such as some examples in which substrate 12 includes a silicon-containing ceramic or a silicon-containing CMC, the bond coat includes elemental silicon.

Barrier coating 14 includes a bulk matrix 20. Bulk matrix 20 may be selected to provide a desired type of protection to substrate 12, such as thermal or environmental protection. Any one or more of a variety of materials may be used for bulk matrix 20 including, but not limited to, aluminum oxide ($Al_2O_3$); a rare earth oxide, such as ytterbium oxide ($Yb_2O_3$), cesium oxide ($Sc_2O_3$), lutetium oxide ($Lu_2O_3$), yttrium oxide ($Y_2O_3$), or gadolinium oxide ($Gd_2O_3$); a rare earth silicate, such as yttrium monosilicate (YMS), yttrium disilicate (DMS), ytterbium monosilicate (YbMS), or ytterbium disilicate (YbDS); a high temperature oxide, such as calcia (CaO), magnesia (MgO), gadolinium zirconate (GdZrO), hafnia (HfO), hafnium silicate (HfSiO), sialon (SiAlON), MgAlO; or the like.

In examples in which barrier coating 14 includes a TBC, bulk matrix 20 may include a thermally insulative material. Examples of TBC materials include ceramic layers including zirconia or hafnia and, optionally, one or more other elements or compounds to modify a desired characteristic of the TBC, such as, for example, phase stability, thermal conductivity, or the like. Exemplary additive elements or compounds include rare earth oxides (oxides of Lu, Yb, Tm, Er, Ho, Dy, Tb, Gd, Eu, Sm, Pm, Nd, Pr, Ce, La, Y, or Sc). Particular examples of materials from which a TBC may be formed include zirconia stabilized with between 7 weight percent (wt. %) and 8 wt. % yttria; zirconia stabilized with ytterbia, samaria, and at least one of lutetia, scandia, ceria, gadolinia, neodymia, or europia; or hafnia stabilized with ytterbia, samaria, and at least one of lutetia, scandia, ceria, gadolinia, neodymia, or europia.

In examples in which barrier coating 14 includes an EBC, bulk matrix 20 may include a material which reduces or substantially prevents attack of substrate 12 by chemical species present in the environment in which article 10 is utilized, e.g., in the intake gas or exhaust gas of a gas turbine engine. For example, bulk matrix 20 may include a material that is resistant to oxidation or water vapor attack. Examples of EBC materials include mullite; glass ceramics such as barium strontium aluminosilicate ($BaO$—$SrO$—$Al_2O_3$-$2SiO_2$; BSAS), calcium aluminosilicate ($CaAl_2Si_2O_8$; CAS), cordierite (magnesium aluminosilicate), and lithium aluminosilicate; and rare earth silicates (silicates of Lu, Yb, Tm, Er, Ho, Dy, Tb, Gd, Eu, Sm, Pm, Nd, Pr, Ce, La, Y, or Sc). The rare earth silicate may be a rare earth monosilicate ($RE_2SiO_5$, where RE stands for "rare earth") or a rare earth di-silicate ($RE_2Si_2O_7$, where RE stands for "rare earth").

Substrate 12 and barrier coating 14 each possess a respective coefficient of thermal expansion (CTE). In some examples, barrier coating 14, or at least a portion of barrier coating 14 adjacent to substrate 12 near inner interface 16, may exhibit a CTE that is the same as, or similar to that of substrate 12, so that barrier coating 14 and substrate 12 exhibit substantially similar thermal contraction or expansion. In some examples, a difference between the CTE of substrate 12 and a region of barrier coating 14 adjacent substrate 12 may be less than $7\times10^{-6}/°$ C., or less than $6.5\times10^{-6}/°$ C., or less than $6\times10^{-6}/°$ C., or less than $5.5\times10^{-6}/°$ C., or about $5\times10^{-6}/°$ C. at room temperature. This may reduce or substantially eliminate stress caused by differential thermal expansion of substrate 12 and barrier coating 14 at the interface of substrate 12 and barrier coating 14 when substrate 12 and barrier coating 14 are heated and cooled. In this way, the integrity of barrier coating 14 may be maintained, and separation, cracking, or spallation of barrier coating 14 may be reduced or prevented, for example, at an interfacial region of barrier coating 14 and substrate 12.

Barrier coating 14 includes a plurality of discrete plugs 22 inset within bulk matrix 20 and dispersed across outer surface 18 of barrier coating 14. The plugs of the plurality of discrete plugs 22 are discrete because they are separate from the other discrete plugs of the plurality of discrete plugs 22. For example, each plug of the plurality of discrete plugs may be surrounded by bulk matrix 20 and a material (e.g., another layer, air) contacting outer surface 18. The plurality of discrete plugs 22 may be inset in bulk matrix 20 by having substantially all (e.g., greater than 90%) of a volume of the plurality of discrete plugs 22 at or below a plane of outer surface 18. For example, the plurality of discrete plugs 22 may each include an outer surface 24 that is at or below a plane of outer surface 24 provided by bulk matrix 20. The plurality of discrete plugs may be dispersed across outer surface 18 of barrier coating 14 by providing at least a portion of a surface area of outer surface 18. In some examples, the outer surfaces 24 of the plurality of discrete plugs 22 are located at outer surface 18 of barrier coating 14, such that the outer surfaces 24 are substantially uncovered by bulk matrix 20. For example, outer surface 18 may include a portion provided by outer surface 24 of each of the plurality of discrete plugs 22 and a portion provided by an outer surface of bulk matrix 20.

A variety of materials may be used for the plurality of discrete plugs 22 including, but not limited to, aluminum oxide ($Al_2O_3$); a rare earth oxide, such as ytterbium oxide ($Yb_2O_3$), cesium oxide ($Sc_2O_3$), lutetium oxide ($Lu_2O_3$), yttrium oxide ($Y_2O_3$), or gadolinium oxide ($Gd_2O_3$); a rare earth silicate, such as yttrium monosilicate (YMS), yttrium disilicate (YDS), ytterbium monosilicate (YbMS), or ytterbium disilicate (YbDS); a high temperature oxide, such as calcia (CaO), magnesia (MgO), gadolinium zirconate (GdZrO), hafnia (HfO), hafnium silicate (HfSiO), sialon (SiAlON), MgAlO; and the like. The composition of the plurality of discrete plugs 22 may be the same as or different from the composition of bulk matrix 20.

Barrier coating 14 may include a discontinuous surface layer 30 and a continuous base layer 28. Surface layer 30 may be formed by a portion of bulk matrix 20 near outer surface 18 and the plurality of discrete plugs 22, and thus have a first set of properties. Base layer 28 may be formed from only bulk matrix 20, and thus have a second set of properties different from the first set of properties of surface layer 30.

The plurality of discrete plugs 22 may introduce structural discontinuities into outer surface 18 of barrier coating 14. These structural discontinuities may interrupt or interfere with physical paths (e.g., dislocations) and/or thermal paths (e.g., heat transfer) through outer surface 18. However, in contrast to grain boundaries or phase boundaries, such structural discontinuities may be localized and limited to surfaces of the plurality of discrete plugs 22. In this way, the plurality of discrete plugs 22 may be used to introduce controllable structural interfaces into surface layer 30 of barrier coating 14.

In some examples, the plurality of discrete plugs 22 may provide resistance to cracking, chipping, or other forms of fracture or dislocation to barrier coating 14. Each plug of the plurality of discrete plugs 22 may include an embedded surface 26 that forms an interface with bulk matrix 20. This interface may act as a discontinuity configured to arrest or deflect fractures created in bulk matrix 20 and/or the plurality of discrete plugs 22. For example, when a crack forms in bulk matrix 20 near outer surface 24, the crack may continue to propagate through bulk matrix 20 until the crack encounters a plug of the plurality of discrete plugs 22. Upon encountering the plug, the crack may dislocate at embedded surface 26. This dislocation interaction may change the geometry of the crack growth site to raise an energy required to continue growth of the crack through bulk matrix 20, such that the crack may be constrained at the interface of embedded surface 26. In this way, the plurality of discrete plugs may reduce crack propagation in barrier coating 14.

In some examples, bulk matrix 20 and the plurality of discrete plugs 22 may have different compositions. For example, bulk matrix 20 may include a first composition and the plurality of discrete plugs 22 may include a second (or more) composition that is different from the first composition of bulk matrix 20. The compositional variation of the plurality of discrete plugs 22 from bulk matrix 20 may introduce additional or alternative material properties into surface layer 30. In contrast to multiphase slurry-based barrier coatings or continuous multilayer barrier coatings, which each may be limited to relatively uniform properties across a surface of the barrier coating, such compositional variations provided by the plurality of discrete plugs 22 may be distributed across outer surface 18 in a variety of different patterns, concentrations, granularities, and the like.

In some examples, the plurality of discrete plugs 22 may provide environmental resistance from chemical species to barrier coating 14, such as resistance to CMAS or water vapor. For example, at high temperatures, a CMAS deposit may form on or in bulk matrix 20 from ingestion of siliceous minerals (dust, sand, volcanic ashes, runway debris, and the like). At high temperatures, the CMAS may be molten on the surface of bulk matrix 20, which allows the CMAS to infiltrate pores of bulk matrix 20. When the component coated with bulk matrix 20 is cooled below the CMAS melting temperature, the CMAS solidifies, which exerts a mechanical strain on bulk matrix 20 and may result in breaking of bulk matrix 20 or spallation of bulk matrix 20 from substrate 12. Spallation of bulk matrix 20 from substrate 12 exposes substrate 12 to attack by water vapor or other environmental species, which may result in recession of substrate 12.

In some examples, the plurality of discrete plugs 22 may include a composition that increases a density of barrier coating 14. For example, as a density of barrier coating 14 increases, barrier coating 14 may become more hermetic to resist ingression of oxidant species and CMAS and/or may improve water vapor resistance by reducing surface recession/volatilization rate. In some examples, barrier coating 14 may be an environmental barrier coating in which the composition of bulk matrix 20 may include ytterbium disilicate and the composition of the plurality of discrete plugs may include ytterbium monosilicate.

In some examples, the plurality of discrete plugs 22 may have a composition that has a different CTE than the CTE of a composition of bulk matrix 20. For purposes of comparison, a bilayer barrier coating may include a first layer with a first composition having a first CTE and a second layer with a second composition having a second CTE that is substantially different than the first CTE, thus creating a CTE mismatch. Such bilayer barrier coating may experience fracture or delamination at an interface between the two layers due to the CTE mismatch between the first and second compositions. However, incorporating the second composition into barrier coating 14 through the plurality of discrete plugs 22, rather than through a continuous layer, may reduce stresses caused by CTE mismatch. For example, the CTE of surface layer 30 of barrier coating 14 may be controlled based on distribution of the plurality of discrete plugs 22 in bulk matrix 20, such that the CTE of surface layer 30 may locally vary within surface layer 30. However, due to the discrete nature of the plurality of discrete plugs 22, thermal stresses caused by such local variation may be smaller and less likely to cause delamination than variation between continuous horizontal phases, such as between layers of a bilayer barrier coating. By incorporating the plurality of discrete plugs 22 across outer surface 24 of barrier coating 14, stresses caused by CTE mismatch between the first and second compositions may be distributed throughout barrier coating 14, reducing a likelihood of delamination. For example, an effective CTE of surface layer 30 may be between a CTE of the first composition of bulk matrix 20 and the second composition of the plurality of discrete plugs 22. In this way, the plurality of discrete plugs 22 may be configured to incorporate materials having advantageous properties into barrier coating 14 while reducing stresses caused by CTE mismatch between the first and second compositions. In some examples, a difference between a coefficient of thermal expansion of the first composition and a coefficient of thermal expansion of the second composition is at least two parts per million (ppm) per degree Celsius at room temperature.

In some examples, the plurality of discrete plugs 22 may contribute enhanced or reduced abradability to barrier coating 14. For example, the plurality of discrete plugs 22 may include a microstructure and composition that is more easily abradable than the microstructure and composition of the bulk matrix 20. For example, the plurality of discrete plugs 22 may include a higher porosity, larger pores, or a lower modulus material to increase abradability of barrier coating 14. The volume and/or cross-sectional area of the plurality of discrete plugs 22 may be selected to tailor abradability of the abradable coating, such as by increasing a cross-sectional area to increase abradability. As will be explained in FIG. 2 below, the plurality of discrete plugs 22 may be present in higher concentrations in a region where contact is anticipated and lower concentrations in another region where contact is less likely. In examples in which barrier coating 14 may encounter high air flow, a pattern, size, shape, and/or composition of the plurality of discrete plugs 22 may be selected to abrade more easily and/or at a higher rate, and thus better control the gas flow, as compared to barrier coatings that do not include the plurality of discrete plugs 22. In this way, the plurality of discrete plugs 22 may be configured to incorporate tailored abrasion properties into barrier coating 14.

Figure 2:
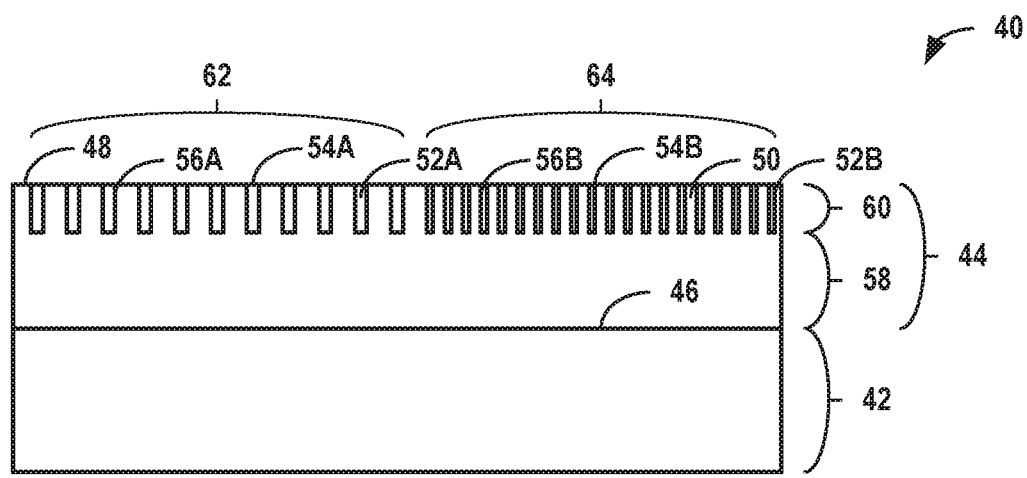
FIG. 2 is a conceptual cross-sectional view of an example article including an example barrier coating that includes multiple regions having different configurations of a plurality of discrete plugs.

As explained above, barrier coatings that incorporate a plurality of discrete plugs into a matrix may enable a greater degree of control of surface properties at various portions of an outer surface of the barrier coating. FIG. 2 is a conceptual cross-sectional view of an example article 40 including an example barrier coating 44 that includes multiple regions having different configurations of a plurality of discrete plugs. Unless otherwise indicated, components of FIG. 2 may be similar to components of FIG. 1. For example, various properties of a substrate 42, barrier coating 44, inner interface 46, outer surface 48, bulk matrix 50, plurality of discrete plugs 52, outer surface 54, embedded surface 56, base layer 58, and surface layer 60 may be similar to substrate 12, barrier coating 14, inner interface 16, outer surface 18, bulk matrix 20, plurality of discrete plugs 22, outer surface 24, embedded surface 26, base layer 28, and surface layer 30 of article 10 of FIG. 1.

Article 40 includes a first region 62 and a second region 64. Article 40 includes a first plurality of discrete plugs 52A in first region 62 and a second plurality of discrete plugs 52B in second region 64. Properties of surface layer 60 in first region 62 and second region 64 may result at least in part from structural and compositional properties of each the respective first plurality of discrete plugs 52A and second plurality of discrete plugs 52B. For example, a composition, depth (e.g., a length, measured substantially normal to outer surface 48 of barrier coating 44), shape, or surface area of each of the first plurality of discrete plugs 52A may be different from a corresponding composition, depth, shape, or surface area of each of the second plurality of discrete plugs 52B. In the example of FIG. 2, a surface area of an outer surface 54A and embedded surface 56A of each of the first plurality of discrete plugs 52A is greater than a surface area of an outer surface 54B and embedded surface 56B of each of the second plurality of discrete plugs 52B. Additional or alternative to individual properties of plugs, properties of surface layer 60 in first region 62 and second region 64 may result at least in part from cumulative distributive properties of the respective first plurality of discrete plugs 52A and second plurality of discrete plugs 52B. For example, a distribution (e.g., pattern or concentration) or aggregate surface area of the first plurality of discrete plugs 52A may be different from a corresponding distribution or aggregate surface area of the second plurality of discrete plugs 52B. In the example of FIG. 2, a concentration of the first plurality of discrete plugs 52A is greater than a concentration of the second plurality of discrete plugs 52B. In some examples, the plurality of discrete plugs is inset within bulk matrix 50 in at least one modified region of barrier coating 44. The plurality of discrete plugs 52 may cover between about 10 percent and about 50 percent of a surface area of the outer surface.

In some examples, the first plurality of discrete plugs 52A and the second plurality of discrete plugs 52B may provide respective first region 62 and second region 64 different properties based on different anticipated operating conditions. For example, first region 62 may be exposed to a higher amount of CMS than second region 64. To increase a likelihood that CMAS will encounter a more resistant composition, the first plurality of discrete plugs 52A may include a higher density material and include a higher surface area and/or greater depth than the second plurality of discrete plugs 52B. As another example, first region 62 may be exposed to greater mechanical stresses than second region 64. To increase a likelihood of a crack encountering an embedded surface 56A, the first plurality of discrete plugs 52A may include smaller diameters and be present at a higher concentration than the second plurality of discrete plugs 52B.

Figure 3:
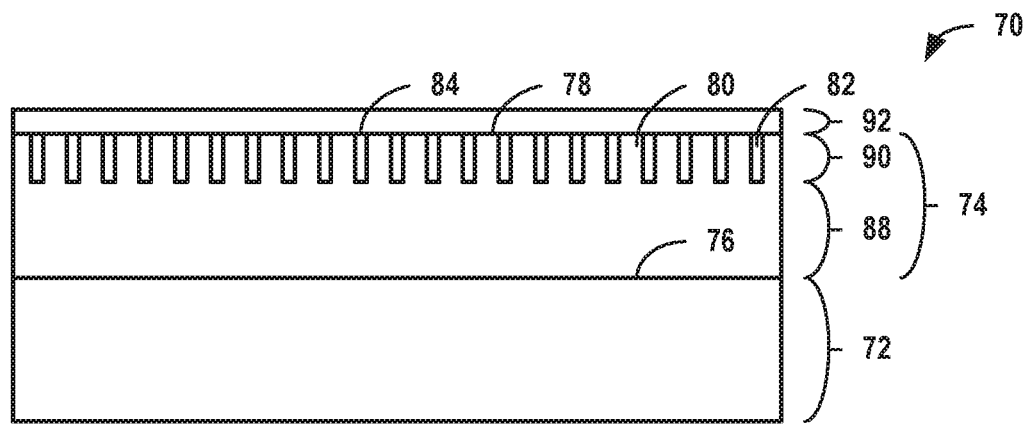
FIG. 3 is a conceptual cross-sectional view of an example article including an example barrier coating that includes a plurality of discrete plugs and an outer layer on an outer surface of barrier coating.

In some examples, barrier coatings as discussed herein may incorporate additional layers on an outer surface of the barrier coating. FIG. 3 is a conceptual cross-sectional view of an example article 70 including an example barrier coating 74 that includes a plurality of discrete plugs and an outer layer on an outer surface of barrier coating 74. Unless otherwise indicated, components of FIG. 3 may be similar to components of FIG. 1. For example, various properties of a substrate 72, barrier coating 74, inner interface 76, outer surface 78, bulk matrix 80, plurality of discrete plugs 82, outer surface 84, base layer 88, and surface layer 90 may be similar to substrate 12, barrier coating 14, inner interface 16, outer surface 18, bulk matrix 20, plurality of discrete plugs 22, outer surface 24, base layer 28, and surface layer 30 of article 10 of FIG. 1.

Article 70 includes an outer layer 92 on outer surface 78 of barrier coating 74. Outer surface 78 may provide additional protection to substrate 72. For example, outer layer 92 may include an EBC, TBC, or abradable coating. A variety of materials may be used for the plurality of discrete plugs 22 including, but not limited to, aluminum oxide ($Al_2O_3$); a rare earth oxide, such as ytterbium oxide ($Yb_2O_3$), cesium oxide ($Sc_2O_3$), lutetium oxide ($Lu_2O_3$), yttrium oxide ($Y_2O_3$), or gadolinium oxide ($Gd_2O_3$); a rare earth silicate, such as yttrium monosilicate (YMS), ytterbium monosilicate (YbMS), or ytterbium disilicate (YbDS); a high temperature oxide, such as calcia (CaO), magnesia (MgO), gadolinium zirconate (GdZrO), hafnia (HfO), hafnium silicate (HfSiO), sialon (SiAlON), MgAlO; and the like. In some examples, outer layer 92 may have a same composition as the plurality of discrete plugs 82.

In some examples, the plurality of discrete plugs 82 may provide a graduated variation in CTE between outer layer 92 and base layer 88. For example, a CTE of the composition of bulk matrix 80 may be different from the CTE of the composition of outer layer 92, creating a CTE mismatch between base layer 88, which is composed of the composition of bulk matrix 80, and outer layer 92. However, the plurality of discrete plugs 82 may have a CTE that is closer to or similar to the CTE of outer layer 92. The combined CTE of the plurality of discrete plugs 82 and bulk matrix 80 may provide surface layer 90 with an effective CTE that is between the CTE of bulk matrix 80 and the CTE of outer layer 92. In this way, stresses created by a CTE mismatch between bulk matrix 80 and outer layer 92 may be reduced.

In some examples, the graduated variation in CTE between outer layer 92 and base layer 88 may be controlled based on structural properties of the plurality of discrete plugs 82. For example, an effective CTE at a cross-section of a particular depth of base layer 88 may be modified based on a ratio of bulk matrix 80 to the plurality of discrete plugs 82 at the particular depth. In some examples, surface layer 90 may have a relatively constant effective CTE. For example, as will be shown in FIG. 5B, the plurality of discrete plugs 82 may have straight sides, which may produce a stepped variation in CTE between outer layer 92 and base layer 88. In some examples, surface layer 90 may have an effective CTE that decreases through surface layer 90 from outer layer 92 to base layer 88. For example, as will be shown in FIG. 5A, the plurality of discrete plugs 82 may have tapered sides that create a gradual variation in CTE between outer layer 92 and base layer 88.

Figure 4:
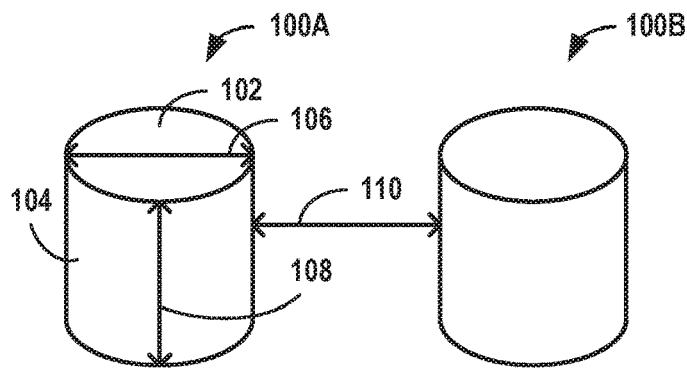
FIG. 4 is a perspective view diagram of two example plugs of a plurality of discrete plugs in a bulk matrix.

As discussed herein, the plurality of discrete plugs may have individual, relative, and collective properties that may provide the outer surface of the barrier coatings with various properties. For example, FIG. 4 is a perspective view diagram of two example plugs 100A and 100B of a plurality of discrete plugs. While illustrated with respect to plugs 100A and 100B, the principles discussed in FIG. 4 may apply to any plugs of the plurality of discrete plugs discussed herein, such as plurality of discrete plugs 22 of FIG. 1 and/or plurality of discrete plugs 52 of FIG. 2.

As illustrated with respect to plug 100A, each plug may include an outer surface 102 and an embedded surface 104. Outer surface 102 may be configured to contact an environment surrounding a respective barrier coating or another layer on the barrier coating. Embedded surface 104 may be configured to contact a bulk matrix of the barrier coating. In some examples, outer surface 102 and/or embedded surface 104 may represent surfaces configured to inhibit passage of active agents through the barrier coating and/or propagation of cracks through the barrier coating. As such, structural properties related to outer surface 102 and/or embedded surface 104 may be selected to inhibit passage of the active agents and/or propagation of the cracks.

Plug 100A may define a diameter 106 at outer surface 102. Diameter 106 may represent a greatest dimension of outer surface 102. In some examples, diameter 106 may be selected to increase a likelihood of plug 100A inhibiting an active agent. For example, as diameter 106 increases, a surface area of outer surface 102 of plug 100A increases, such that an active agent is more likely to encounter outer surface 102 of plug 100A, rather than a bulk matrix surrounding plug 100A. In some examples, diameter 106 may be selected to reduce a magnitude of stresses created by a CTE mismatch between plug 100A and a bulk matrix surrounding plug 100A. For example, as diameter 106 decreases, a magnitude of stress created by a CTE mismatch between plug 100A and the bulk matrix may decrease. The article of claim 1, wherein each plug of the plurality of discrete plugs has a diameter at the outer surface between about 1 micrometer and about 1 millimeter. In some examples, diameter 106 may be selected such that outer surface 102 covers between about 1 square micrometer and about 1 square millimeter.

Plug 100A may define a length or depth 108. Depth 108 may represent a greatest length measured substantially normal to an outer surface of the barrier coating, such as from outer surface 102 to a bottom of plug 100A. In some examples, depth 108 may be selected to increase a likelihood of plug 100A inhibiting an active agent. For example, as depth 108 increases, a surface area of embedded surface of depth 108 increases, such that an active agent is more likely to encounter embedded surface 104, rather than continue through a bulk matrix surrounding plug 100A. In some examples, depth 108 may be selected to control a depth of barrier layer having variation in CTE. For example, as depth 108 decreases, a depth of the barrier coating that experiences stresses related to CTE mismatch may decrease. As another example, as depth 108 increases, a distance over which variation in CTE mismatch may extended may be increased. In some examples, depth 108 of plug 100A may be between about 10 percent and about 50 percent of a thickness of the barrier coating. In some examples, a depth 108 of 100A may be between about 10 micrometers and about 500 micrometers.

Adjacent plugs 100A and 100B may define a spacing 110 between nearest edges of plugs 100A and 100B. Spacing 110 may represent a distribution of plugs 100A and 100B in a region of a barrier coating. In some examples, spacing 110 may be selected to increase a likelihood of plugs 100A and 100B inhibiting an active agent. For example, as spacing 110 decreases, a volume of a surrounding bulk matrix between plugs 100A and 100B decreases, such that an active agent travelling in at non-normal angle from an outer surface of the barrier coating may be more likely to encounter embedded surface 104 of plug 100A, rather than only a bulk matrix surrounding plug 100A. In some examples, spacing 110 may be selected to reduce a magnitude of stresses created by a CTE mismatch between plug 100A and a bulk matrix surrounding plug 100A. For example, as diameter 106 decreases, a magnitude of stress created by a CTE mismatch between plug 100A and the bulk matrix may decrease. In some examples, adjacent plugs of the plurality of discrete plugs have spacing 110 between about 5 micrometers and about 100 micrometers.

Figure 5A:
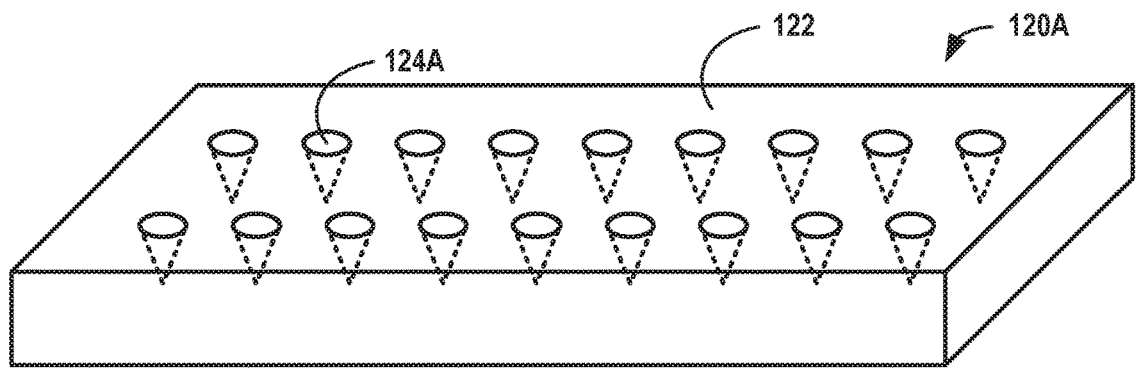
FIG. 5A is a perspective view diagram of an example article that includes conical plugs.
Figure 5B:
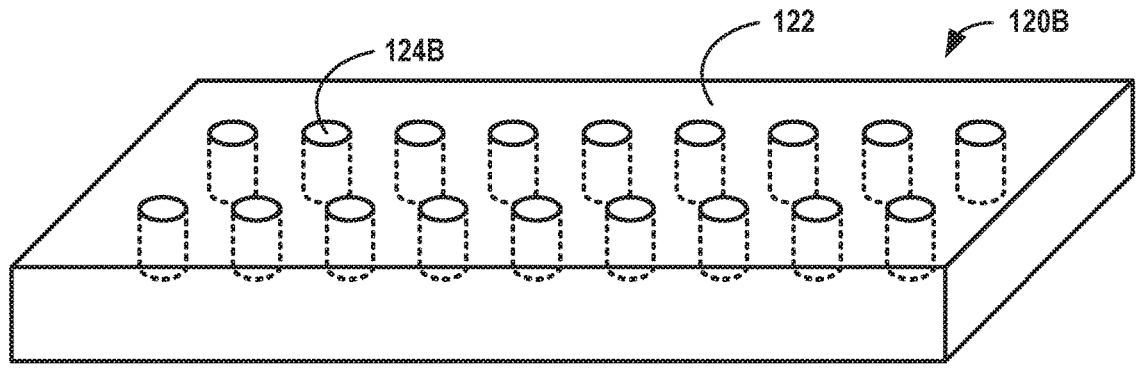
FIG. 5B is a perspective view diagram of an example article that includes cylindrical plugs.
Figure 5C:
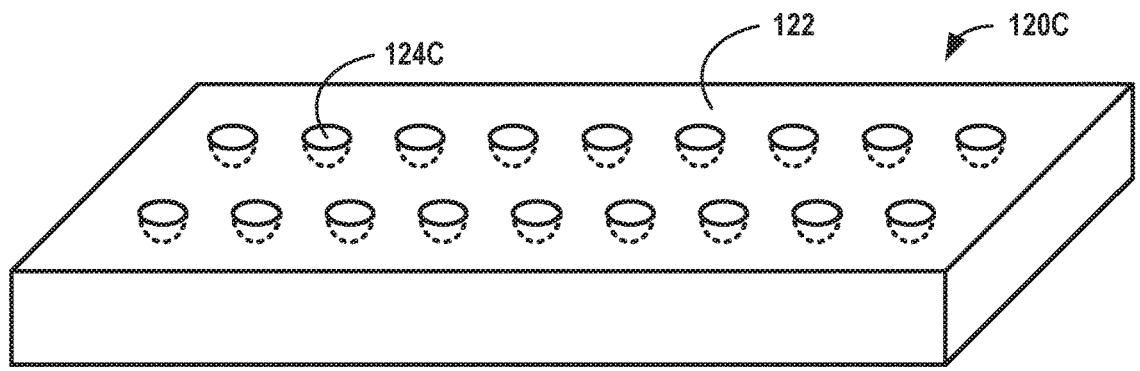
FIG. 5C is a perspective view diagram of an example article that includes hemispherical plugs.

As discussed herein, the plurality of discrete plugs may have a variety of shapes. FIGS. 5A-5C illustrate example barrier coatings 120A-120C having various shapes of a plurality of discrete plugs 124A-124C in a bulk matrix 122. The plurality of discrete plugs 124A-124C may have a variety of shapes including, but not limited to, a cylinder, a block, a pyramid, a hemisphere, a cone, or a truncated cone. In some instances, more than the plurality of discrete plugs 124A-124C may have more than one shape. For example, a first portion of a barrier coating may have a first plurality of discrete plugs having a conical shape to reduce migration of chemical species, while a second portion of the same barrier coating may have a second plurality of discrete plugs having a cylindrical shape to permit a high density of the second plurality of discrete plugs.

FIG. 5A is a perspective view diagram of an example barrier coating 120A that includes conical plugs 124A in bulk matrix 122. Each of the plurality of conical plugs 124A may have a decreasing cross-section with increasing depth into barrier coating 120A. As such, each of the plurality of cylindrical plugs may have a relatively high surface area due to high cross-section at the outer surface and a relatively low stress caused by a CTE mismatch may due to decreasing cross-section into a depth of barrier coating 120A.

FIG. 5B is a perspective view diagram of an example barrier coating 120B that includes cylindrical plugs 124B in bulk matrix 122. Each of the plurality of cylindrical plugs 124B may have a constant cross-section with increasing depth into barrier coating 120B. As such, each of the plurality of cylindrical plugs 124B may have a relatively high embedded surface area into barrier coating 120B.

FIG. 5C is a perspective view diagram of an example barrier coating 120C that includes hemispherical plugs 124C in bulk matrix 122. Each of the plurality of hemispherical plugs 124C may have a quickly decreasing cross-section with increasing depth. As such, each of the plurality of hemispherical plugs 124C may have a relatively high surface area and a relatively shallow depth.

While FIGS. 5A-5C illustrate shapes that have different depth profiles (e.g., z-axis), in other examples, dimensions of a plurality of discrete plugs may vary along other axes (e.g., x-axis and/or y-axis). For example, a plurality of discrete plugs used for an abradable coating may have an oval cross-sectional shape that may have a largest diameter aligned with, for example, an anticipated direction of rubbing between the abradable coating and another component.

Figure 6:
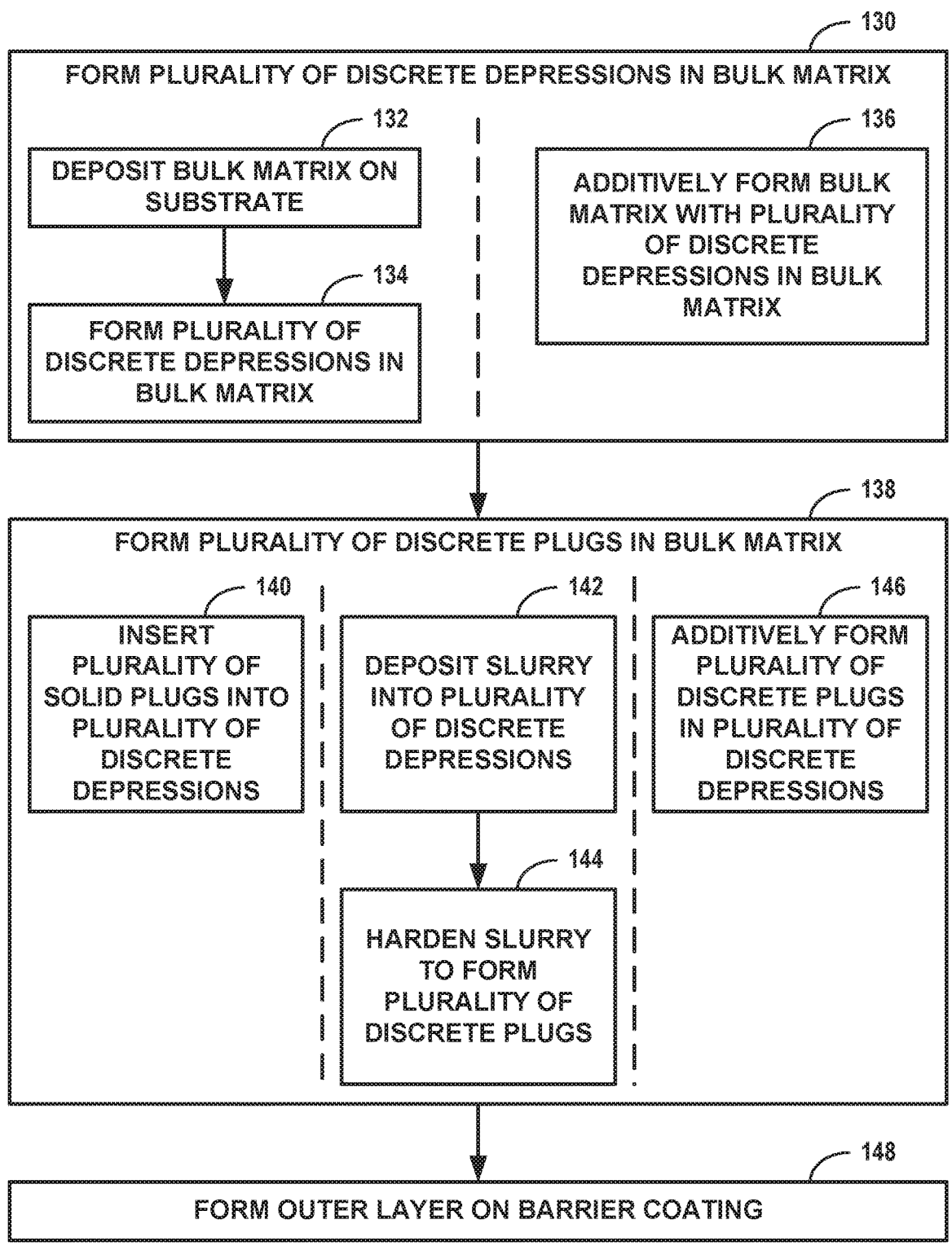
FIG. 6 is a flow diagram illustrating an example technique for forming a barrier coating in accordance with this disclosure.

As described herein, a plurality of discrete plugs may be formed in a bulk matrix in a variety of ways. For example, in contrast to multiphase barrier coatings formed from slurries or multilayer barrier coatings formed from layer deposition, the barrier coatings discussed herein may be formed using methods that may enable a greater degree of control of properties of the barrier coating at various depths and/or across various surfaces. FIG. 6 is a flow diagram illustrating example methods for forming a barrier coating on a substrate that includes a plurality of discrete plugs inset within a bulk matrix and dispersed across an outer surface of the barrier coating. FIG. 6 will be described with respect to FIGS. 1-3; however, the techniques of FIG. 6 may be used to form other barrier coatings.

The example method of FIG. 6 includes forming a bulk matrix on a substrate that includes a plurality of discrete depressions in the bulk matrix (130). For example, the plurality of discrete depressions may correspond in size, shape, and/or relative spacing to a size, shape, and/or relative spacing of the plurality of discrete plugs 22 to be inserted and/or formed in the discrete depressions of bulk matrix 20. As such, various structural properties of the plurality of discrete plugs 120 as discussed with respect to FIG. 4 may apply to the plurality of discrete depressions in the bulk matrix.

In some examples, the example method of FIG. 6 may include forming the bulk matrix on the substrate that includes the plurality of discrete depressions by depositing the bulk matrix on the substrate (132) and forming the plurality of discrete depressions in the bulk matrix (134). For example, bulk matrix 20 may be deposited on substrate 12 using a variety of techniques including, but not limited to, plasma spray, high velocity oxygen fuel, electron beam physical vapor deposition, plasma sprayed physical vapor deposition, suspensions plasma spray, direct vapor deposition, or a slurry process. Once bulk matrix 20 has been deposited on substrate 12, the plurality of discrete depressions may be formed within bulk matrix 20 by subtractive manufacturing processes. For example, the plurality of discrete depressions may be formed from bulk matrix 20 using a variety of techniques including, but not limited to, laser drilling, mechanical cutting, mechanical drilling, or any other process that removes material from bulk matrix 20 to form the plurality of discrete depressions.

In some examples, the example method of FIG. 6 may form the bulk matrix on the substrate that includes the plurality of discrete depressions by additively forming the bulk matrix on the substrate that includes the plurality of discrete depressions (136). For example, bulk matrix 20 may be deposited on substrate 12 by successively depositing bulk matrix 20 in layers in a patter to form the plurality of discrete depressions. Bulk matrix 20 may be deposited on substrate 12 using a variety of techniques including, but not limited to, binder jet or powder impregnated fused deposition modeling (FDM), powder bed fusion (PBF), directed energy deposition (DED), or any other process that adds material in a geometrically controlled manner to form the plurality of discrete depressions.

The example method of FIG. 6 includes forming the plurality of discrete plugs in the discrete depressions of the bulk matrix (138). For example, as discussed above, the plurality of discrete depressions may correspond in size, shape, and/or relative spacing to a size, shape, and/or relative spacing of the plurality of discrete plugs 22 to be inserted and/or formed in the discrete depressions of bulk matrix 20.

In some examples, the example method of FIG. 6 may form the plurality of discrete plugs in the discrete depressions by inserting a plurality of solid plugs into the plurality of discrete depressions (140). For example, the plurality of discrete plugs 22 may be formed outside the plurality of discrete depressions and inserted into the plurality of discrete depressions once formed. The plurality of discrete plugs 22 may be formed using a variety of techniques including, but not limited to, plasma spray, high velocity oxygen fuel, electron beam physical vapor deposition, plasma sprayed physical vapor deposition, suspensions plasma spray, direct vapor deposition, or any other process capable of forming the plurality of discrete plugs 22 to specification. Once the plurality of discrete plugs 22 are formed, the plurality of discrete plugs 22 may be inserted into the plurality of discrete depressions.

In some examples, the example method of FIG. 6 may form the plurality of discrete plugs in the discrete depressions by depositing a slurry into the plurality of discrete depressions (142) and hardening the slurry to form the plurality of discrete plugs (144). For example, a slurry may be spread across a surface of bulk matrix 20, such that the slurry may infiltrate the plurality of discrete depressions. Once the plurality of discrete depressions has been infiltrated by the slurry, the barrier coating may undergo a thermal process to harden the slurry and form the plurality of discrete plugs in the plurality of discrete depressions.

In some examples, the example method of FIG. 6 may form the plurality of discrete plugs in the discrete depressions by additively forming the plurality of discrete plugs in the plurality of discrete depressions (146). For example, the plurality of discrete plugs 22 may be deposited in the plurality of discrete depression in bulk matrix 20 by successively depositing material in layers to form the plurality of discrete plugs 22. Bulk matrix 20 may be deposited on substrate 12 using a variety of techniques including, but not limited to, binder jet or powder impregnated fused deposition modeling (FDM), powder bed fusion (PBF), directed energy deposition (DED), or any other process that adds material in a geometrically controlled manner to form the plurality of discrete depressions.

In some examples, the example methods of FIG. 6 may be modified to produce a plurality of discrete plugs that have different structural and/or compositional properties, such as shown in FIG. 2. For example, the example methods of FIG. 6 may include forming a first plurality of discrete depressions in bulk matrix 50 having a first size, shape, and distribution in first region 62 and forming a second plurality of discrete depressions in bulk matrix 50 having a second size, shape, and/or distribution in second region 64 that is different from the first plurality of discrete depressions. The example methods of FIG. 6 may include forming the first plurality of discrete plugs 52A for insertion into the first plurality of discrete depressions and forming the second plurality of discrete plugs 52B for insertion into the second plurality of discrete depressions. Alternatively, the example methods of FIG. 6 may include applying a slurry to outer surface 48 of barrier coating 44 to infiltrate the first and second plurality of discrete depressions and hardening the slurry to form the respective first plurality of discrete plugs 52A and the second plurality of discrete plugs 52B. In this way, the example methods of FIG. 6 may be used to form a barrier coating having multiple regions, each with a set of properties.

In some examples, the example method of FIG. 6 may include forming an outer layer on the outer surface of the barrier coating, such as shown in FIG. 3 (148). For example, once the plurality of discrete plugs 82 have been formed and/or inserted into the plurality of discrete depressions of bulk matrix 80, outer layer 92 may be deposited on outer surface 78. Outer layer 92 may be formed on barrier coating 74 using a variety of techniques including, but not limited to, plasma spray, high velocity oxygen fuel, electron beam physical vapor deposition, plasma sprayed physical vapor deposition, suspensions plasma spray, direct vapor deposition, or a slurry process.

Various examples have been described. These and other examples are within the scope of the following claims.

What is claimed is:

1. An article comprising:
    a substrate; and
    a barrier coating on the substrate extending from an inner interface facing the substrate to an outer surface opposite the inner interface, wherein the barrier coating comprises:
        a bulk matrix; and
        a plurality of discrete plugs inset only within the bulk matrix, wherein each of the plurality of discrete plugs includes an outer surface located at the outer surface of the barrier coating, wherein each plug of the plurality of discrete plugs has a greatest length, measured substantially normal to the outer surface of the barrier coating, that is less than a thickness of the barrier coating, and wherein at least a portion of the plurality of discrete plugs is distributed in a pattern having a substantially uniform spacing and depth.

2. The article of claim 1,
    wherein the bulk matrix comprises a first material or phase composition, and
    wherein the plurality of discrete plugs comprises a second material or phase composition, different from the first material or phase composition.

3. The article of claim 2, wherein a difference between a coefficient of thermal expansion of the first material or phase composition and a coefficient of thermal expansion of the second material or phase composition is at least two parts per million (ppm) per degree Celsius at room temperature.

4. The article of claim 2, wherein the first material or phase composition and the second material or phase composition comprise at least one of aluminum oxide, a rare earth oxide, a rare earth silicate, or a high temperature oxide.

5. The article of claim 4, wherein the barrier coating comprises an environmental barrier coating, a thermal barrier coating, or an abradable coating.

6. The article of claim 2,
    wherein the barrier coating is an environmental barrier coating,
    wherein the first material or phase composition comprises ytterbium disilicate, and
    wherein the second material or phase composition comprises ytterbium monosilicate.

7. The article of claim 1,
    wherein the plurality of discrete plugs comprises a first plurality of discrete plugs in a first region and a second plurality of discrete plugs in a second region, and
    wherein at least one of a material or phase composition, distribution, depth, shape, or surface area of the first plurality of discrete plugs is different from a corresponding material or phrase composition, distribution, depth, shape, or surface area of the second plurality of discrete plugs.

8. The article of claim 1, wherein the outer surfaces of the plugs of the plurality of discrete plugs covers between about 10 percent and about 50 percent of a surface area of the outer surface of the barrier coating.

9. The article of claim 1, wherein the outer surface of each plug of the plurality of discrete plugs covers between about 1 square micrometer and about 1 square millimeter.

10. The article of claim 1, wherein the greatest length of each plug of the plurality of discrete plugs is between about 10 percent and about 50 percent of a thickness of the barrier coating.

11. The article of claim 1, wherein the greatest length of each plug of the plurality of discrete plugs is between about 10 micrometers and about 500 micrometers.

12. The article of claim 1, wherein each plug of the plurality of discrete plugs has a diameter at the outer surface between about 1 micrometer and about 1 millimeter.

13. The article of claim 1, wherein adjacent plugs of the plurality of discrete plugs have a spacing between nearest edges of adjacent plugs of between about 5 micrometers and about 100 micrometers.

14. The article of claim 1, wherein each plug of the plurality of plugs defines a shape of at least one of a cylinder, a block, a pyramid, a cone, or a truncated cone.

15. A method comprising:
    forming a barrier coating on a substrate extending from an inner interface facing the substrate to an outer surface opposite the inner interface, wherein the barrier coating comprises:
        a bulk matrix; and
        a plurality of discrete plugs inset only within the bulk matrix, wherein each of the plurality of discrete plugs includes an outer surface located at the outer surface of the barrier coating, wherein each plug of the plurality of discrete plugs has a greatest length, measured substantially normal to the outer surface of the barrier coating, that is less than a thickness of the barrier coating, and wherein at least a portion of the plurality of discrete plugs is distributed in a pattern having a substantially uniform spacing and depth.

16. The method of claim 15, wherein forming the barrier coating comprises:
    forming a bulk matrix on the substrate that includes a plurality of discrete depressions in the bulk matrix; and
    forming the plurality of discrete plugs in the discrete depressions.

17. The method of claim 16, wherein forming the bulk matrix on the substrate that includes the plurality of discrete depressions comprises at least one of:

depositing the bulk matrix on the substrate and forming the plurality of discrete depressions in the bulk matrix, or additively forming the bulk matrix on the substrate that includes the plurality of discrete depressions.

18. The method of claim 16, wherein forming the plurality of discrete plugs comprises at least one of:

inserting a plurality of solid plugs into the plurality of discrete depressions, depositing a slurry into the plurality of discrete depressions and hardening the slurry to form the plurality of discrete plugs, or additively forming the plurality of discrete plugs in the plurality of discrete depressions.

19. The article of claim 1, wherein each plug of the plurality of discrete plugs defines a shape having a decreasing cross-section with an increasing depth from the outer surface of the barrier coating.

20. The article of claim 1, wherein the barrier coating comprises:

a discontinuous surface layer comprising:
 a first portion of the bulk matrix adjacent to the outer surface; and
 the plurality of discrete plugs; and a continuous base layer comprising only a second portion of the bulk matrix.

\* \* \* \* \*